United States Patent [19]

Kashiwagi et al.

[11] Patent Number: 5,321,985
[45] Date of Patent: Jun. 21, 1994

[54] MAGNETOSTRICTION TYPE TORQUE SENSOR

[75] Inventors: Yoichiro Kashiwagi; Gen Sasaki; Hisashi Shiraki, all of Kariya; Kaneo Mohri, Nagoya, all of Japan

[73] Assignee: Kabushiki Kaisha Toyoda Jidoshokki Seisakusho, Kariya, Japan

[21] Appl. No.: 12,628

[22] Filed: Feb. 2, 1993

Related U.S. Application Data

[63] Continuation of Ser. No. 650,052, Feb. 4, 1991, abandoned.

[30] Foreign Application Priority Data

Feb. 7, 1990 [JP] Japan .................................. 2-27373

[51] Int. Cl.$^5$ ............................................. G01L 3/02
[52] U.S. Cl. ........................... 73/862.335; 73/862.333; 73/DIG. 2; 324/209
[58] Field of Search .................. 73/862.333, 862.335, 73/862.336, 779, DIG. 2; 324/209

[56] References Cited

U.S. PATENT DOCUMENTS

| | | | |
|---|---|---|---|
| 2,557,393 | 6/1951 | Rifenbergh | 73/862.335 X |
| 3,861,206 | 1/1975 | Kawafune et al. | 73/DIG. 2 X |
| 4,364,278 | 12/1982 | Horter et al. | 324/209 X |
| 4,414,855 | 11/1983 | Iwasaki | 73/862.36 |
| 4,576,051 | 3/1986 | Lautenschlager | 73/862.36 |
| 4,627,298 | 12/1986 | Sahashi et al. | 73/862.36 |
| 4,762,008 | 8/1988 | Kobayashi et al. | 73/862.36 |
| 4,896,544 | 1/1990 | Garshelis | 73/862.36 |
| 4,918,418 | 4/1990 | Tsala | 73/862.36 X |
| 5,022,275 | 6/1991 | Satoh et al. | 73/862.335 |
| 5,036,713 | 8/1991 | Ikeda et al. | 324/209 X |

FOREIGN PATENT DOCUMENTS

61-41936 2/1986 Japan .

*Primary Examiner*—Richard E. Chilcot, Jr.
*Assistant Examiner*—Elizabeth L. Dougherty
*Attorney, Agent, or Firm*—Brooks Haidt Haffner & Delahunty

[57] ABSTRACT

A magnetostriction type torque sensor has a magnetostrictive film formed on an outer peripheral surface of a rotary shaft, a coil having a coil centerline extending in a radial direction of the rotary shaft, and a signal processor responsive to coil impedance. Since the coil includes a coil centerline extending in a radial direction of the rotary shaft, magnetic fluxes are formed mainly in a radial direction of the rotary shaft. Accordingly, the magnetic fluxes intruding deep into the rotary shaft are decreased, and the rate of the magnetic fluxes passing through the magnetostrictive film is increased. As a result, the magnetostriction type torque sensor comes to have high sensitivity even when the rotary shaft has high magnetic permeability or high electric conductivity.

8 Claims, 9 Drawing Sheets

MAGNETOSTRICTION TYPE TORQUE SENSOR

This application is a continuation, of application Ser. No. 07/650,052, filed Feb. 4, 1991, now abandoned.

BACKGROUND OF THE INVENTION

1. Field of the Invention

The present invention relates to a magnetostriction type torque sensor.

2. Description of the Prior Art

FIG. 11 illustrates an example of prior art magnetostriction type torque sensors. The magnetostriction type torque sensor comprises magnetostrictive films 91 and 92 formed on outer peripheral surfaces of a rotary shaft 9, excitation coils 93 and 93 disposed around the rotary shaft 9 away from the magnetostriction films 91 and 92 by a predetermined distance in a radial direction, and detection coils 94 and 94 disposed on the excitation coils 93 and 93.

Configurational magnetic anisotropies are given to the configurations of the magnetostrictive films 91 and 92 so that the magnetostrictive films 91 and 92 are subjected to stresses acting in direction being opposite to each other. In a magnetic film having positive magnetostriction, for instance, in the magnetostrictive film 91 subjected to a tensile stress, the magnetic permeability of the magnetostrictive film 91 increases because of the inverse magnetostrictive effect. On the other hand, for instance, in the magnetostrictive film 92 subjected to a compression stress, the magnetic permeability of the magnetostrictive film 92 decreases because of the inverse magnetostrictive effect. Hence, the mutual inductances between the excitation coils 93 and the detection coils 94 vary in directions being opposite to each other when an alternating current is applied in the excitation coils 93 and 93, and accordingly the torques of the rotary shaft 9 can be detected from the output voltage differences between the detection coils 94 and 94.

However, when detecting the torques of a rotary shaft 9 made of iron, steel or the like having high magnetic permeability with the prior art magnetostriction type torque sensor, most of the mutual inductances between the excitation coils 93 and the detection coils 94 are generated by the rotary shaft 9 itself, and small mutual inductance components result from magnetic fluxes passing through the magnetostrictive films 91 and 92, namely most of the magnetic fluxes have passed through the rotary shaft 9. Hence, the variation rate of the mutual inductance resulting from the magnetic permeability variation of the magnetostrictive film 92 has been small. As a result, the prior art magnetostriction type torque sensor has been suffering from a problem of low detection sensitivity or S/N ratio (i.e., signal-to-noise ratio).

Likewise, when detecting the torques of a rotary shaft 9 made of iron, steel, aluminum alloy, titanium or the like having high electric conductivity with the prior art magnetostriction type torque sensor, the impedances of the excitation coils 93 decrease because of the eddy current loss resulting from alternating magnetic fluxes penetrating through the rotary shaft 9. Hence, the prior art magnetostriction type torque sensor has again exhibited deteriorated detection sensitivity or S/N ratio.

SUMMARY OF THE INVENTION

The present invention has been developed in order to solve the above-described problems. It is therefore an object of the present invention to provide a magnetostriction type torque sensor having high sensitivity.

The above and other objects of the present invention can be achieved by a magnetostriction type torque sensor according to the present invention, the magnetostriction type torque sensor comprising:

a magnetostrictive film formed on an outer peripheral surface of a rotary shaft having at least high magnetic permeability or high electric conductivity;

an excitation coil for generating magnetic fluxes penetrating the magnetostrictive film, the excitation coil disposed on a peripheral surface being adjacent to the magnetostrictive film;

a detection coil disposed adjacent to the magnetostrictive film in a manner crossing with the magnetic fluxes, the detection coil including a coil center line extending in a radial direction of the rotary shaft; and a signal processor for detecting torques of the rotary shaft from impedance variations of the detection coil.

The detection coil may be arranged so as to work both as the excitation coil and the detection coil.

The magnetostrictive film may be formed of an amorphous ribbon, a PVD (physical vapor deposition) film made of an Fe-Ni alloy, a plasma sprayed film made of an Fe-Ni alloy or the like.

The high magnetic permeability herein shall mean a relative magnetic permeability of 500 or more, and the high electric conductivity herein shall mean an electric conductivity of 100 micro-mho/cm or more.

When a torque is exerted on the rotary shaft, the magnetic permeability of the magnetostrictive film varies. As a result, the magnitude of the magnetostrictive film magnetization by the excitation coil, the number of magnetic flux lines linking with the detection coil, and the voltage between the both ends of the detection coil vary in this order.

In particular, since the centerline of the detection coil extends in a radial direction of the rotary shaft in the present invention, the magnetic fluxes are formed mainly in a radial direction of the rotary shaft. Accordingly, magnetic flux component passing through the magnetostrictive film is increased. Further, there arises a magnetic resistance influence (i.e., repellencies between the lines of the magnetic forces constituting the magnetic fluxes) and the skin effect. Hence, the magnetic fluxes intruding deep into the rotary shaft are decreased. As a result, the impedance component of the detection coil, resulting from the eddy current loss and the hysterisis loss in the rotary shaft, is decreased. Further, the inductance component of the detection coil, resulting from the magnetic fluxes passing through the rotary shaft but not passing through the magnetostrictive film, is also decreased.

Thus, the rate of the components, depending on the magnetic fluxes passing through the magnetostrictive film, with respect to the inductance of the detection coil is increased, and the inductance variation of the detection coil with respect to a predetermined magnetic permeability variation of the magnetostrictive film is increased. Eventually, the magnetostriction type torque sensor according to the present invention comes to have high sensitivity.

Further, even when the rotary shaft has the high magnetic permeability, the rate of the magnetic fluxes passing through the rotary shaft is decreased, and the magnetic modulation caused by magnetic heterogeneity is decreased. Hence, the magnetostriction type torque sensor according to the present invention comes to have higher sensitivity or S/N ratio Furthermore, even when the rotary shaft has the high electric conductivity, the impedance variation of the detection coil resulting from the eddy current loss in the rotary shaft is decreased, and the inductance variation of the detection coil with respect to a predetermined magnetic permeability variation of the magnetostrictive film is increased. Hence, the magnetostriction type torque sensor according to the present invention comes to have higher sensitivity or S/N ratio.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Embodiment

The magnetostriction type torque sensor of the First Preferred Embodiment according to the present invention will be hereinafter described with reference to FIGS. 1 through 4.

The magnetostriction type torque sensor comprises magnetostrictive films 1 and 2 (Not shown in FIG. 1, see FIG. 2.) formed on outer peripheral surfaces of a rotary shaft 9, coils 3 and 4 working both as the excitation coil and the detection coil and disposed adjacent to the magnetostrictive films 1 and 2, and a signal processor 5 (See FIG. 4.) for detecting the differences between the self-inductances of the coils 3 and 4.

Figure 1:
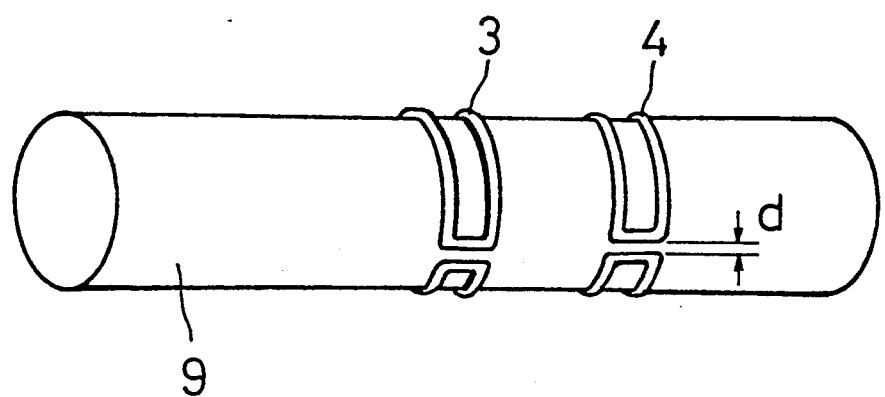
FIG. 1 is a plan view illustrating coils 3 and 4 employed by a magnetostriction type torque sensor of a First Preferred Embodiment according to the present invention.
Figure 2:
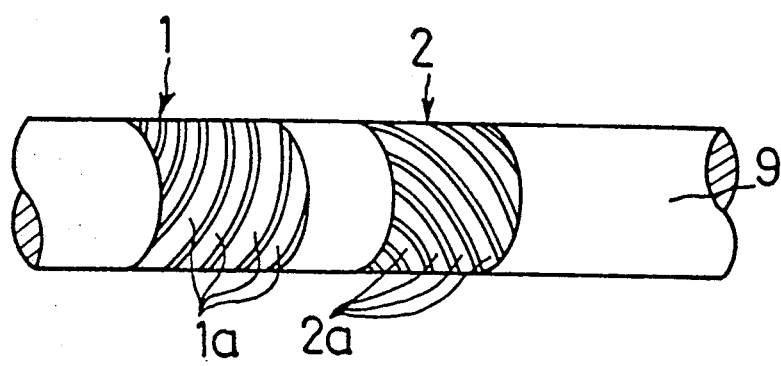
FIG. 2 is a perspective view illustrating magnetostrictive films 1 and 2 employed by the magnetostriction type torque sensor of the First Preferred Embodiment according to the present invention.

The rotary shaft 9 is made of a carbon steel rod having a diameter of 2 cm. The magnetostrictive films 1 and 2 are made of a sputtered film comprising 40% by weight of Fe and 60% by weight of Ni, and formed in a size of approximately 10 micrometers in film thickness and 4 mm in width. As illustrated in FIG. 2, the magnetostrictive film 1 is formed to have a left lead angle of 45 degrees with respect to the central axis of the rotary shaft 9 and to include a plurality of band films 1a disposed obliquely at predetermined intervals, and the magnetostrictive film 2 is formed to have a right lead angle of 45 degrees with respect to the central axis of the rotary shaft 9 and to include a plurality of band films 2a disposed obliquely at predetermined intervals. The band films 1a and 2a are designed to have a width of 3 mm, and the intervals between the neighboring band films 1a and the intervals between the neighboring band films 2a are designed to have a width of 1 mm.

Figure 3:
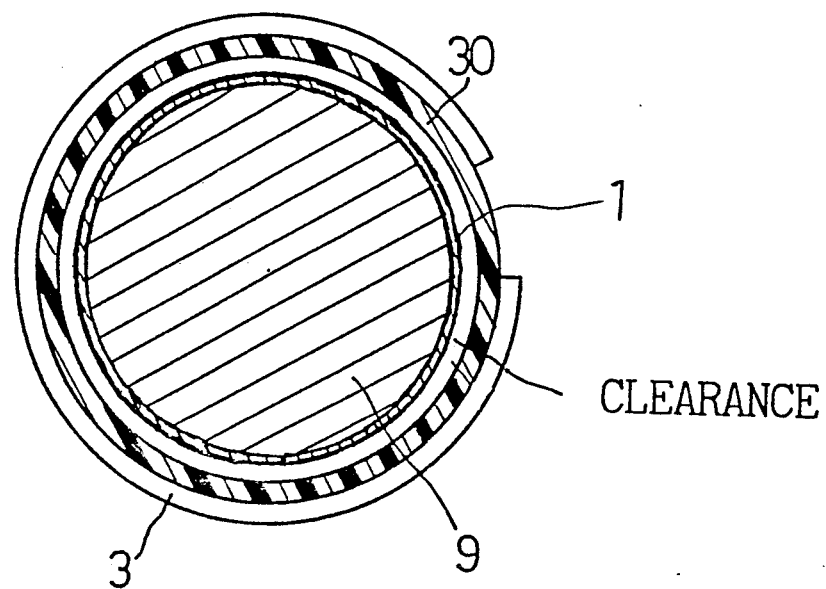
FIG. 3 is a cross sectional view illustrating an arrangement of the coil B in a peripheral direction.

The coils 3 and 4 are independently disposed on outer peripheral surfaces of coil bobbins 30 and 40 (Not shown in FIG. 1, see FIG. 3.) in a saddle-like configuration. As illustrated in FIG. 3, the coil bobbins 30 and 40 are made of a resin, and disposed around the rotary shaft 9 away from the magnetostrictive films 1 and 2 by a small clearance. The coils 3 and 4 are wound 200 turns, and have a coil width of 20 mm in an axial direction, respectively. Further, a clearance "d" (See FIG. 1.) in a peripheral direction is designed to be 2 mm, and clearances between the coils 3 and the magnetostrictive film 1 and clearances between the coils 4 and the magnetostrictive film 2 are designed to be 1 mm.

Figure 12:
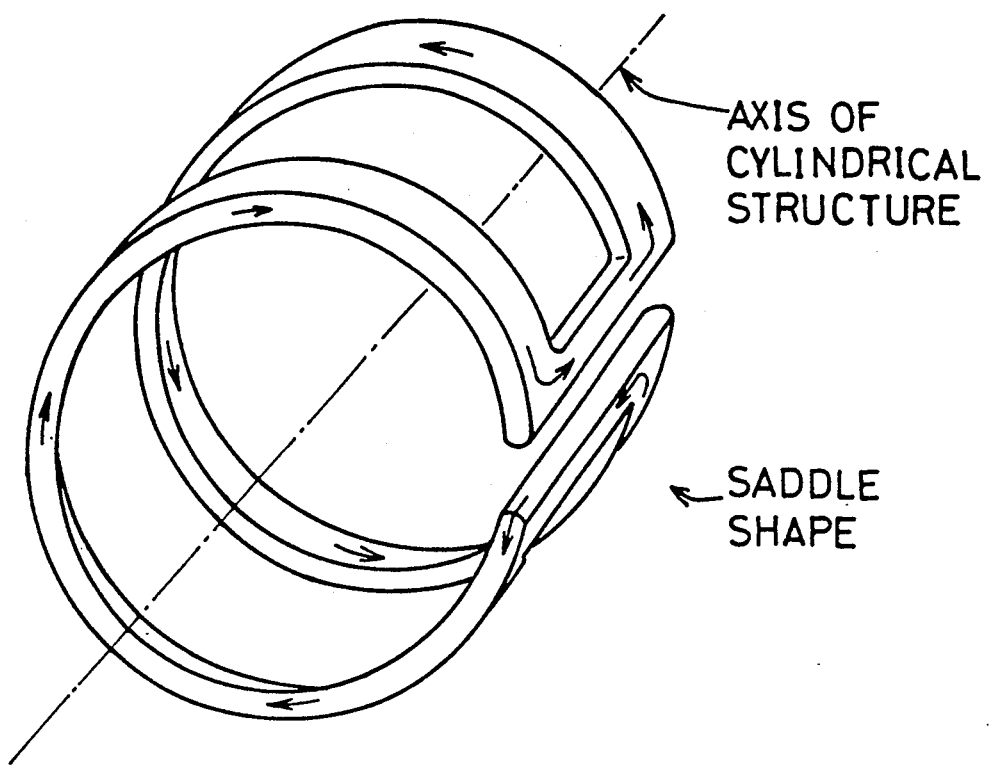
FIG. 12 is a perspective view of a coil employed in the embodiment of FIG. 1 but removed from the shaft.
Figure 13:
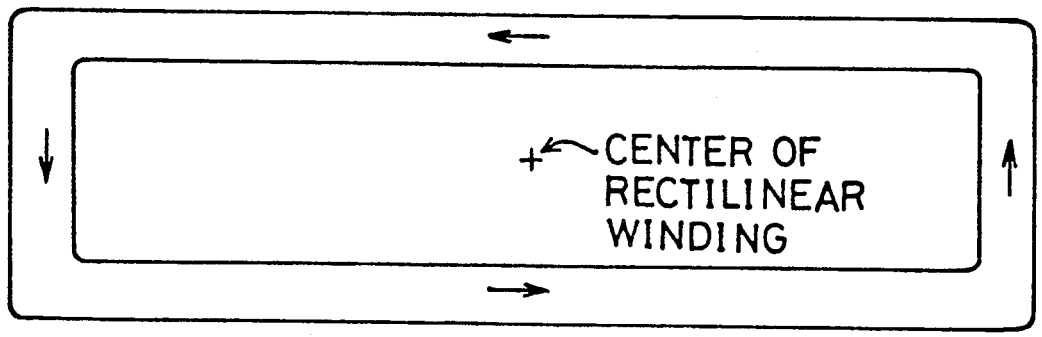
FIG. 13 is a development view of the coil of FIG. 12.

The coils 3 and 4 are identical. In order to better understand the terminology used herein, reference should be had to FIG. 12 showing in perspective the coil 3 removed from the shaft 9. The small arrows indicate the path followed by the wire constituting the winding of the coil. While not shown, the ends of the wire are brought out for connection to the detection circuit described below. As clearly seen in FIG. 12, the coil structure is saddle shape, having been formed into a cylindrical configuration about an axis identified as the "AXIS OF CYLINDRICAL STRUCTURE." If the coil 3 were to be developed, the development would appear as a rectangle as shown in FIG. 13. It should be obvious that the wire windings of the coil, following the small arrows, encircle a center which has been identified as the "CENTER OF RECTILINEAR WINDING." The imaginary line passing through that "center" normal to the plane of the paper is referred to herein as the centerline of the coil. It can be thought of as the magnetic axis of the coil, a center of magnetic symmetry.

Figure 4:
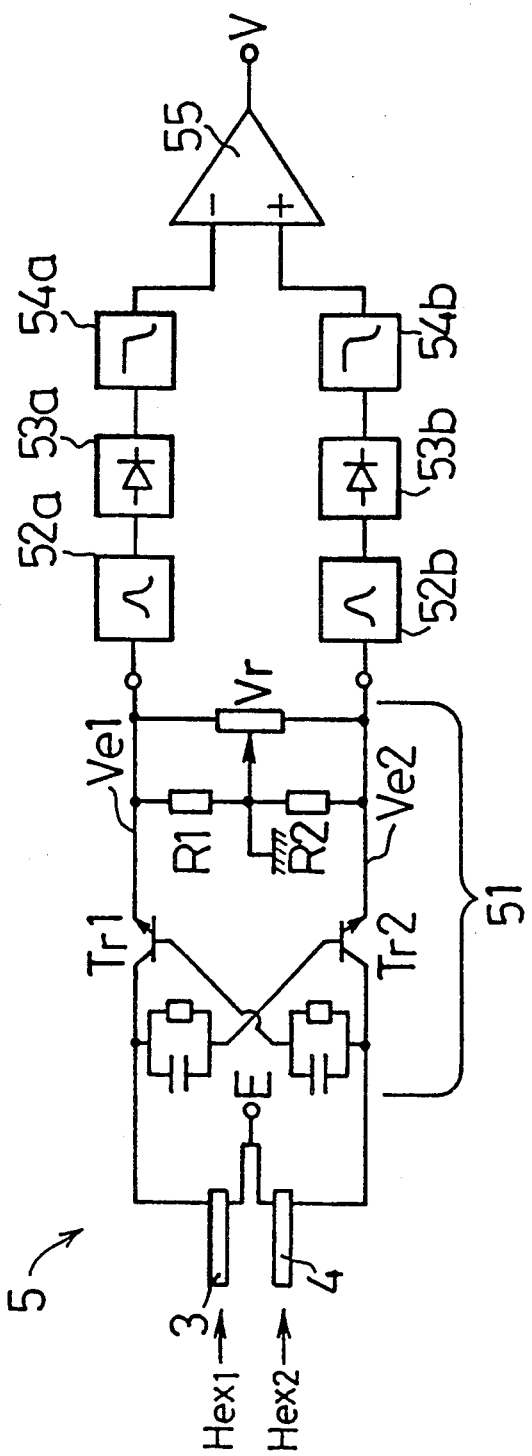
FIG. 4 is an electric circuit block diagram of a signal processor 5 employed by the magnetostriction type torque sensor of the First Preferred Embodiment according to the present invention.

With reference to FIG. 4, the signal processor 5 will be hereinafter described along with the operation of the magnetostriction type torque sensor of the First Preferred Embodiment according to the present invention. The signal processor 5 comprises a dual magnetic core multivibrator type oscillator circuit 51, tuning amplifiers 52a and 52b, detection circuits 53a and 53b, low-pass filters 54a and 54b and a differential amplifier 55.

Two (2) input terminals of the oscillator circuit 51 are connected to one ends of the coils 3 and 4, and the other end of the coils 3 and 4 are connected to a high voltage electric power source "E". The oscillator circuit 51 includes an astable multivibrator employing transistors "Tr1" and "Tr2." The coils 3 and 4 constitute collector loads of the transistors "Tr1" and "Tr2" independently. The emitters of the transistors "Tr1" and "Tr2" are grounded by way of emitter resistors "R1" and "R2" independently, and are also grounded by way of a 3-terminal sliding resistor "Vr."

The oscillator circuit 51 oscillates at a predetermined frequency "f1" in a pulsating manner, and pulsating currents are applied to the collectors of the transistors "Tr1" and "Tr2." The internal stresses of the rotary shaft 9 vary the magnetic permeabilities of the magnetostrictive films 1 and 2 in opposite directions, namely one in an increasing direction and the other in a decreasing direction, thereby modulating the self-inductances of the coils 3 and 4. As a result, both of the collector currents, i.e., pulsating currents, undergo an amplitude modulation because of the magnetic permeability variations of the magnetostrictive films 1 and 2. Both of the collector currents subjected to the amplitude modulation vary the emitter voltages "Ve1" and "Ve2" when flowing over the emitter resistors "R1" and "R2." Here, the 3-terminal sliding resistor "Vr" is a resistor for adjusting the zero point.

The emitter voltages "Ve1" and "Ve2" are amplified around the frequency "f1" (i.e., the center frequency) by the tuning amplifiers 52a and 52b. The output voltages from the tuning amplifiers 52a and 52b are then detected by the detection circuits 53a and 53b, and the components of the carrier wave frequency "f1" in the detected voltages are out independently by the low-pass filters 54a and 54b. Finally, the differences between the output voltages from the low-pass filter 54a and the output voltages from the low-pass filter 54b are amplified by the differential amplifier 55, and made into an output voltage "V."

Figure 5:
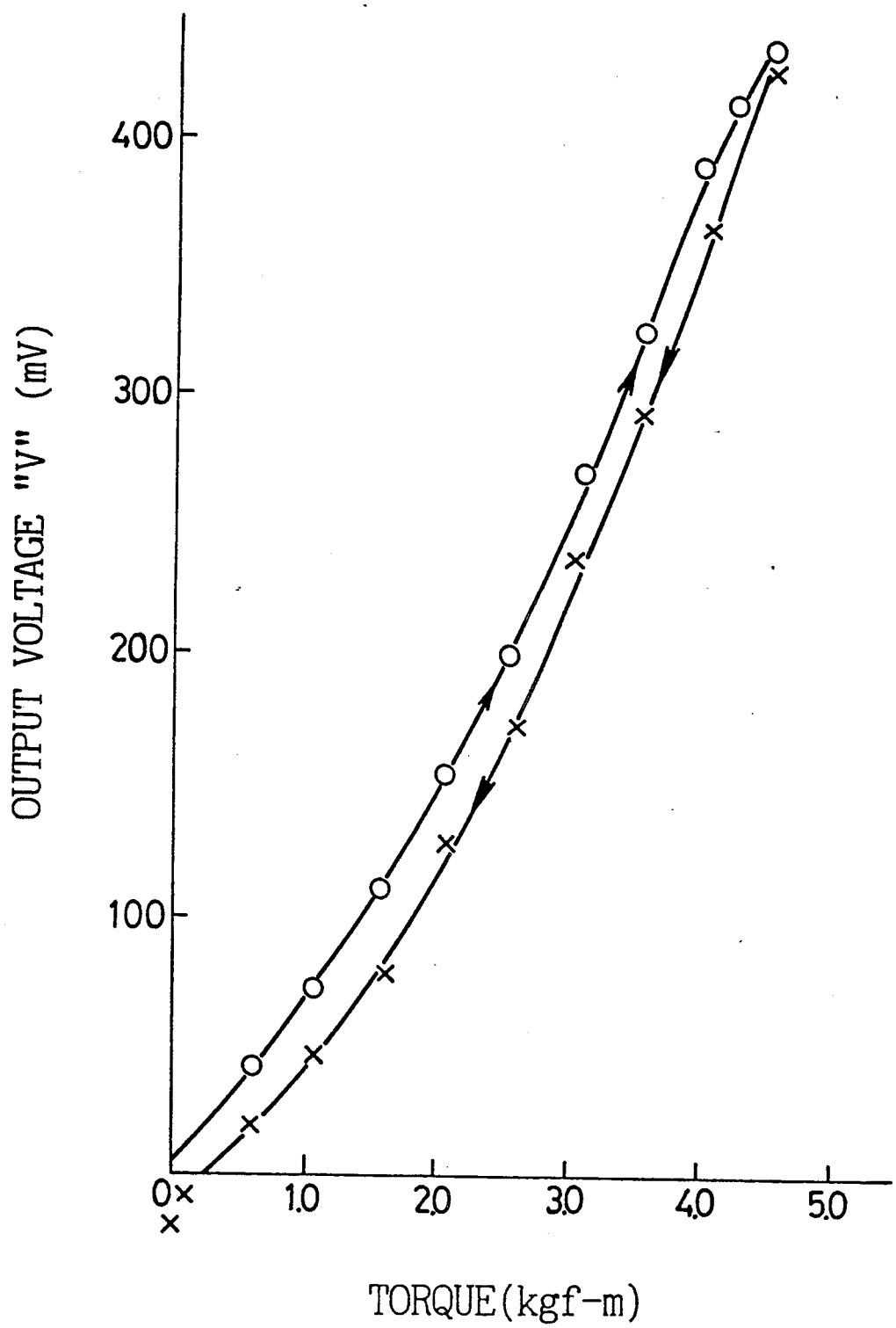
FIG. 5 is a characteristic curve illustrating the relationship between output voltages "V" and torques exhibited by the magnetostriction type torque sensor of the First Preferred Embodiment according to the present invention.

A characteristic curve, illustrating the relationship between the output voltages "V" thus obtained and the torques of the rotary shaft 9, is illustrated in FIG. 5. When obtaining the characteristic curve, the carrier wave frequency "f1" and the electric current applied to the coils 3 and 4 are designed to be 34 KHz and 100 mA in the signal processor 5 respectively, and accordingly the overall amplification factor of the signal processor is designed to be 40 dB.

Figure 6:
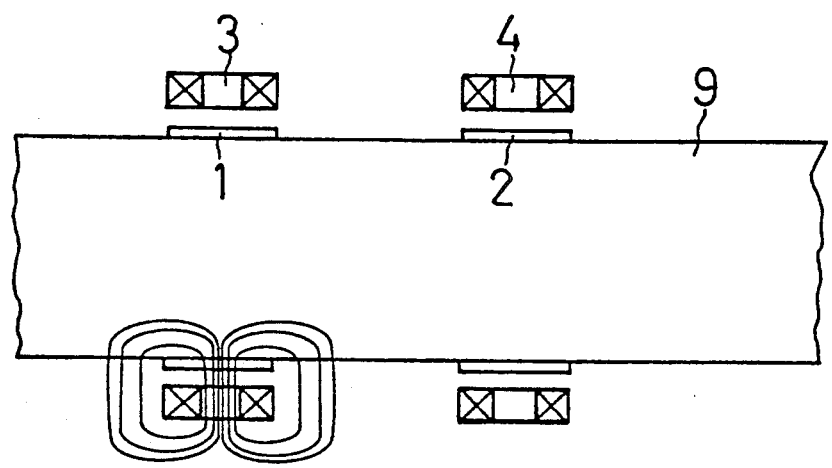
FIG. 6 is a schematic diagram illustrating a distribution of magnetic fluxes exhibited by the magnetostriction type torque sensor of the First Preferred Embodiment according to the present invention.
Figure 7:
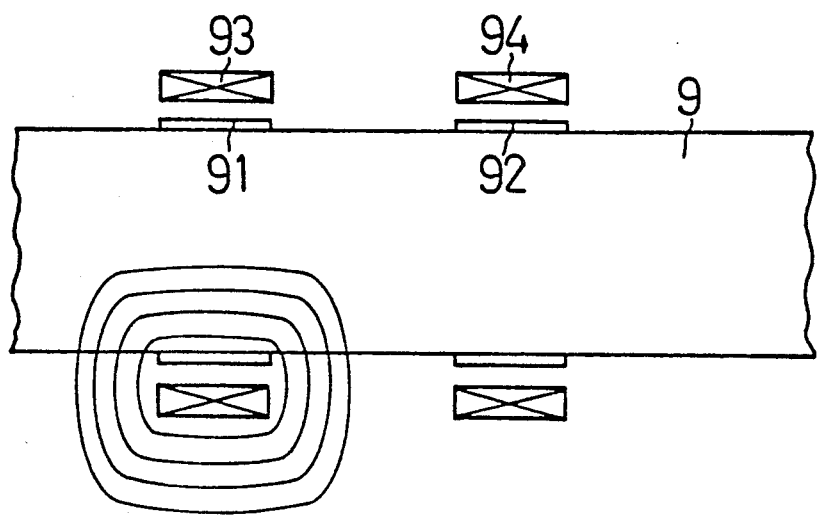
FIG. 7 is a schematic diagram illustrating a distribution of magnetic fluxes exhibited by a conventional magnetostriction type torque sensor.
Figure 11:
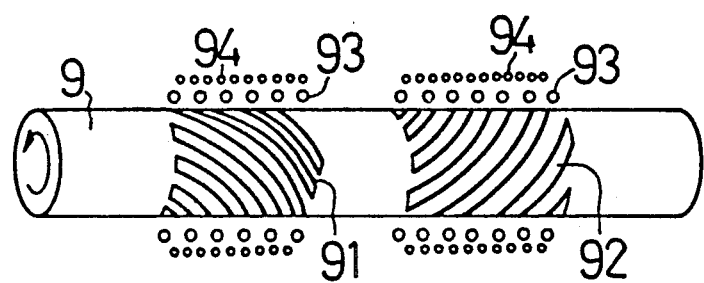
FIG. 11 is a perspective view of a conventional magnetostriction type torque sensor.

A schematic diagram illustrating a distribution of magnetic fluxes exhibited by the magnetostriction type torque sensor of the First Preferred Embodiment according to the present invention is illustrated in FIG. 6, and a schematic diagram illustrating a distribution of magnetic fluxes exhibited by the conventional magnetostriction type torque sensor (See FIG. 11.) is illustrated in FIG. 7. It is apparent from FIGS. 6 and 7 that the magnetic fluxes extend mainly in an axial direction of the rotary shaft 9 in the conventional magnetostriction type torque sensor, and that the magnetic fluxes extend mainly in a radial direction of the rotary shaft 9 in the magnetostriction type torque sensor of the First Preferred Embodiment.

Hence, the magnetic fluxes are localized on the peripheral portions of the rotary shaft 9 in the magnetostriction type torque sensor of the First Preferred Embodiment according to the present invention. As a result, the impedance variations of the coils 3 and 4 are increased, thereby achieving a high sensitivity. The impedance variations result from the magnetic permeability variations of the magnetostrictive films 1 and 2 caused by the internal stresses of the rotary shaft 9.

Second Preferred Embodiment

Modified versions of the magnetostriction type torque sensor of the First Preferred Embodiment according to the present invention will be hereinafter described with reference to FIGS. 8 through 10. The configurations and dispositions of the coils 3 and 4 are modified in the following preferred embodiments, but the arrangements of the other constituents are identical with those of the First Preferred Embodiment The magnetostriction type torque sensor of the Second Preferred Embodiment according to the present invention will be hereinafter described. Turning now to FIG. 10, the coil 3 of the magnetostriction type torque sensor includes twelve (12) unit coils "C" disposed in rotation symmetry and connected in series. The unit coils "C" contacting and neighboring are wound in directions being opposite to each other as indicated by the directions of electric current shown in FIG. 10. The coil 4 has an arrangement equivalent thereto. Naturally, the coil centerlines of the unit coils "C" extend in a radial direction of the rotary shaft 9. In the magnetostriction type torque sensor of the Second Preferred Embodiment, the unit coils "C" constituting the coils 3 and 4 may be collectively wound on coil bobbins 30 and 40 in an overlapping winding manner or a wave winding manner, such as a coil winding manner in a motor.

Since the magnetostriction type torque sensor of the Second Preferred Embodiment according to the present invention thus arranged operates and effects advantages similarly to the First Preferred Embodiment, the operation thereof will not be described herein.

Third Preferred Embodiment

Figure 8:
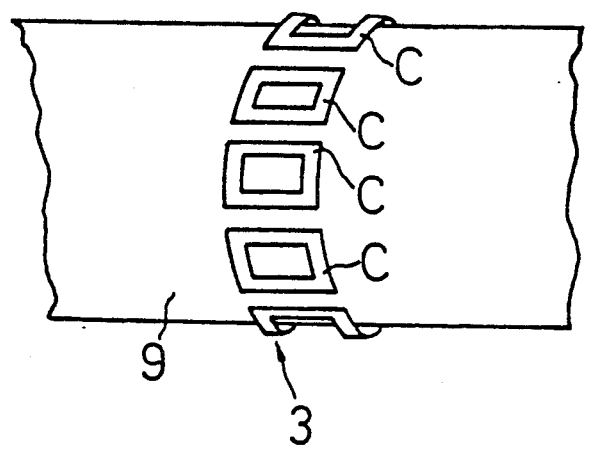
FIG. 8 is a perspective view illustrating a magnetostriction type torque sensor of a Third Preferred Embodiment according to the present invention.

Turning now to FIG. 8, the magnetostriction type torque sensor of the Third Preferred Embodiment according to the present invention will be hereinafter described. As illustrated in FIG. 8, there are provided clearances between the unit coils "C" neighboring each other in a peripheral direction in the magnetostriction type torque sensor of the Third Preferred Embodiment. In the magnetostriction type torque sensor of the Third Preferred Embodiment, the coil center lines of the unit coils "C" naturally extend in a radial direction of the rotary shaft 9, but it is not necessary to wind the unit coils "C" neighboring each other in directions opposite to each other.

Since the magnetostriction type torque sensor of the Third Preferred Embodiment according to the present invention thus arranged operates and effects advantages similarly to the First Preferred Embodiment, the operation thereof will not be described herein.

Fourth Preferred Embodiment

Figure 9:
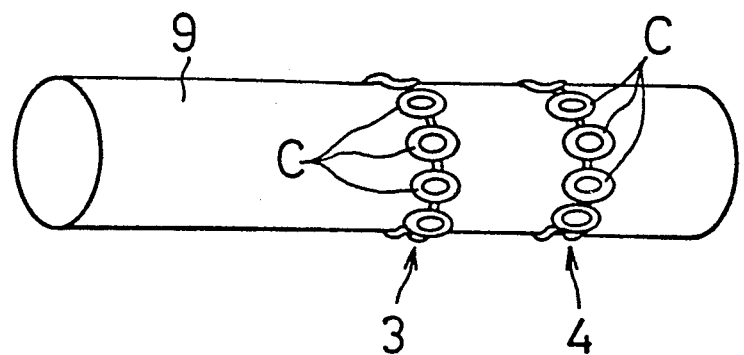
FIG. 9 is a perspective view illustrating a magnetostriction type torque sensor of a Fourth Preferred Embodiment according to the present invention.
Figure 10:
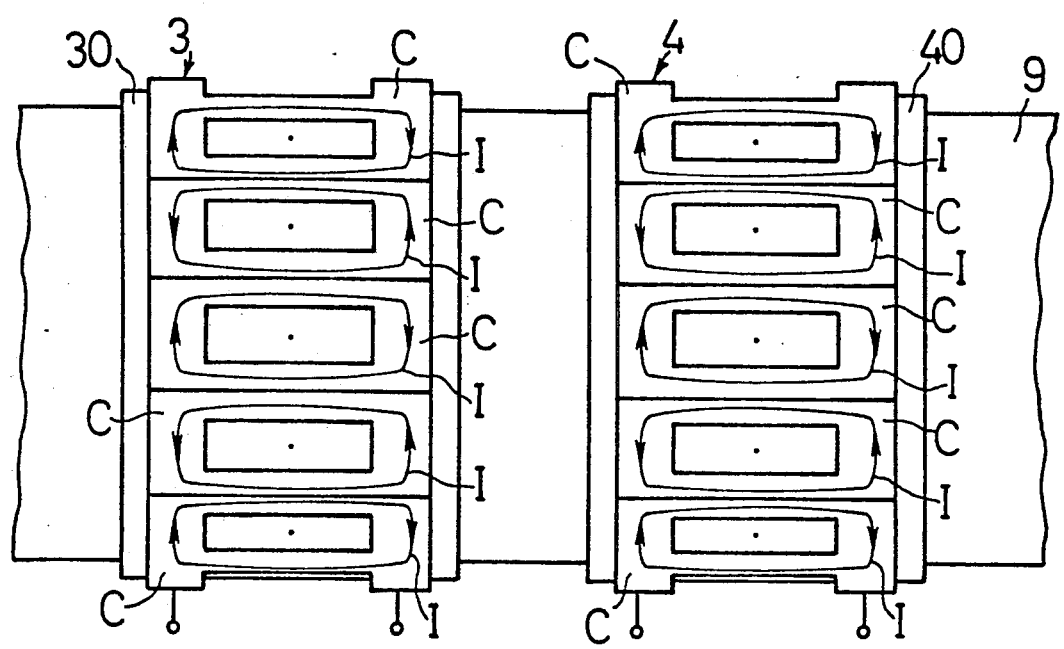
FIG. 10 is a plan view illustrating coils 3 and 4 employed by a magnetostriction type torque sensor of a Second Preferred Embodiment according to the present invention.

As illustrated in FIG. 9, the unit coils "C" of the coils 3 and 4 are formed in a circular shape in the magnetostriction type torque sensor of the Fourth Preferred Embodiment. Also in the magnetostriction type torque sensor of the Fourth Preferred Embodiment, the coil center lines of the unit coils "C" naturally extend in a radial direction of the rotary shaft 9.

Since the magnetostriction type torque sensor of the Fourth Preferred Embodiment according to the present invention thus arranged operates and effects advantages similarly to the First Preferred Embodiment, the operation thereof will not be described herein.

Having now fully described the present invention, it will be apparent to one of ordinary skill in the art that many changes and modifications can be made thereto without departing from the spirit or scope of the present invention as set forth herein including the appended claims.

What is claimed is:

1. A magnetrostriction type torque sensor comprising in combination:

a magnetostrictive film formed over a given surface area on an outer peripheral surface of a rotary shaft formed from a material having at least high magnetic permeability or high electric conductivity;

a coil having a centerline about which its windings are wound to form said coil, said coil being disposed adjacent said magnetostrictive film with said centerline oriented radially relative to said rotary shaft, said coil being provided with a cylindrical curvature but being non-helical and disposed substantially concentric with but radially spaced substantially uniformly from said peripheral surface of said shaft; and impedance measuring means including a source of alternating current coupled to said coil for providing a torque proportional signal output responsive to variations in the impedance of said coil resulting from shaft torque induced variation in permeability of said magnetostrictive film.

2. A magnetostrictive type torque sensor according to claim 1, wherein said coil is wider in the circumferential direction of said shaft than in the axial direction of said shaft.

3. A magnetostrictive type torque sensor according to claim 1, wherein said given surface area extends completely around said shaft and said coil extends circumferentially more than half way around the periphery of said magnetostrictive film.

4. A magnetostrictive type torque sensor according to claim 1, wherein said coil has a rectilinear shape when viewed radially of said shaft with two sides extending circumferentially relative to said shaft.

5. A magnetostrictive type torque sensor according to claim 1, wherein said given surface area extends completely around said shaft, and said coil extends circumferentially substantially entirely about said shaft, and extends in the shaft axial direction substantially extensively with said given surface area.

6. A magnetostrictive type torque sensor comprising in combination:

a magnetostrictive film formed over a given surface area on an outer peripheral surface of a rotary shaft formed from a material having at least high magnetic permeability or high electric conductivity;

a coil having a centerline about which its windings are wound to form said coil, said coil being disposed adjacent said magnetostrictive film with said centerline oriented radially relative to said rotary shaft, said coil being provided with a cylindrical curvature but being non-helical and disposed substantially concentric with but radially spaced substantially uniformly from said peripheral surface of said shaft; and impedance measuring means including a source of alternating current coupled to said coil for providing a torque proportional signal output responsive to variations in the impedance of said coil resulting from shaft torque induced variation in permeability of said magnetostrictive film, said coil including a plurality of unit coils connected in series and disposed in a cylindrical array with adjacent unit coils in side by side contact and wound in opposite directions.

7. A magnetostrictive type torque sensor according to claim 6, wherein said given surface area extends completely around said shaft, and said coil extends circumferentially substantially entirely about said shaft, and extends in the shaft axial direction substantially coextensively with said given surface area.

8. A magnetostrictive type torque sensor comprising in combination:

a magnetostrictive film formed over a given surface area on an outer peripheral surface of a rotary shaft formed from a material having at least high magnetic permeability or high electric conductivity;

a coil having a centerline about which its windings are wound to form said coil, said coil being disposed adjacent said magnetostrictive film with said centerline oriented radially relative to said rotary shaft, said coil being provided with a cylindrical curvature but being non-helical and disposed substantially concentric with but radially spaced substantially uniformly from said peripheral surface of said shaft; and impedance measuring means including a source of alternating current coupled to said coil for providing a torque proportional signal output responsive to variations in the impedance of said coil resulting from shaft torque induced variation in permeability of said magnetostrictive film, said given surface area extending completely around said shaft, and said coil consisting of a single saddle-shaped winding substantially completely encircling said shaft.

* * * * *